INVENTOR.
Francis W. Blake

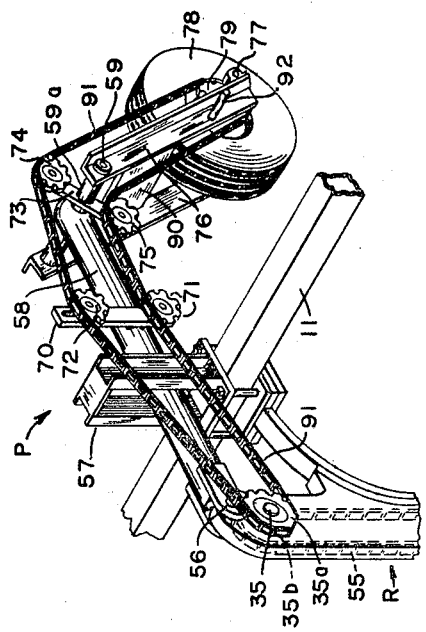
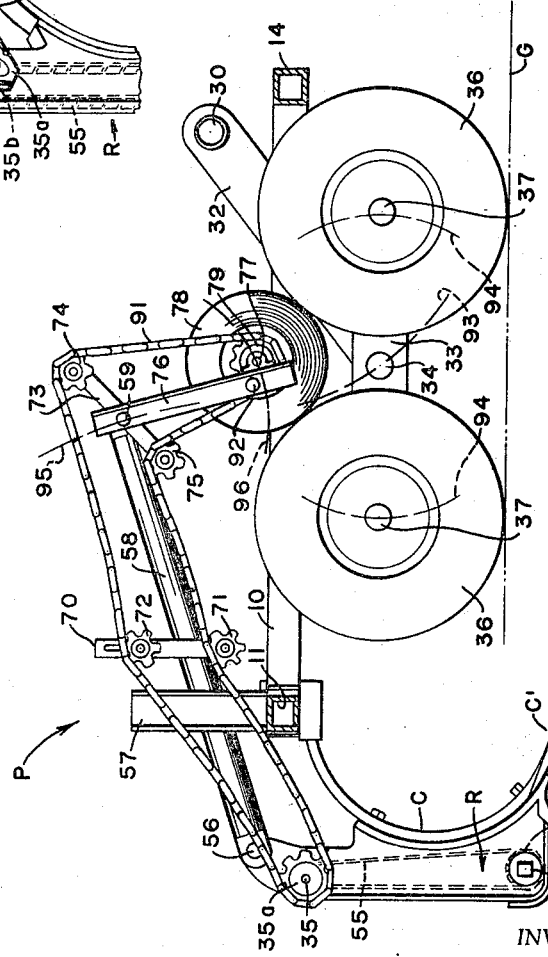

United States Patent Office 3,422,908
Patented Jan. 21, 1969

3,422,908
FARM TOOL CARRIER
Francis W. Blake, Hereford, Colo. 80732
Filed Dec. 17, 1964, Ser. No. 419,081
U.S. Cl. 172—106    3 Claims
Int. Cl. A01b 35/00, 39/00

ABSTRACT OF THE DISCLOSURE

A farm tool carrier having a frame, an operable tool on the frame, a front to back aligned pair of tandem rockable weight-carrying main wheels mounted on the end of a pivot-crank rotatably held on and centrally of the frame, hydraulic ram means for rotatably actuating and holding the pivot-crank for effecting a raising and lowering of the frame, and a dog-leg-pendulum power take-off means for operating said tool by power from the peripheries of both of said main wheels and including a driven wheel riding on the peripheries of both of said main wheels.

---

This invention relates to farm tool carriers, in the agricultural art, adapted for use with interchangeable farm tools, and, more particularly to such farm tools needed in connection with dry land farming.

Such dry land farming is usually on a large acreage scale of comparatively flat terrain, though slightly rolling, and requires repeated operations during a year. Cultivation is required to properly prepare the soil and keep down the weeds several times during the year when the ground is not planted but permitted to lie idle, and known as summer fallowing. In the western part of our nation, dry land farmers. so called, strip-farm their land, meaning, they divide their tillable land into equal and usually similar sized and shaped areas. Each year a dry land crop, such as wheat, will be planted at every other of such areas, and the areas in between the planted areas are summer-fallowed according to well recognized farming practices and for such reasons as preservation of moisture, prevention of soil erosion by blowing, and enrichment of the soil as the summer-fallowed portions are permitted to lie idle every other season. As a result of their repeated cultivation and while lying idle, or summer-fallowed, benefit is derived from the sun during such idle season. It will be understood that in the idle or non-growing season of such summer-fallowing of such dry land, that said cultivation is accomplished by enormous agricultural dry land tools, which are pulled through the soil approximately 3″ to 6″ under the surface to keep the soil from baking and hardening, and those tools are commonly known as dry land chisels. Heavy and rugged machinery is necessarily required in such dry land chiseling preparation of the soil every year.

The usual dry land farm tool carrier, as far as known, is of a single unit construction, having a plurality of wheels incapable of adapting themselves to use over uneven terrain, mainly because of the overall, large width of a single unit horizontal rigid frame which has the wheels thereof adjustably held at all times in a fixed vertical position during use and with relation to the frame.

I usually use a large tool carrier of 3 sections, with a main center section having plural pairs of wheels and an outer section hinged to each of the right and left hand sides thereof, and with each outer section having only one pair of wheels, whereby in use over uneven ground the outer sections are able to hingedly rise and fall with relation to the center section, and I provide a novel method of pivotly mounting each pair of wheels of a section to better adapt a section of my carrier for use over uneven ground. I pivotly mount each of my pair of wheels in a novel tandem manner for free rocking of a pair of wheels on a novel rocker arm, and with each tandem pair of rocker wheels being independently mounted for rocker movement.

In the dry land chisel cultivator art, it is conventional to use a rotating square rod to be pulled sideways thereof under the ground behind the chisel blades and at the same time to rotate that rod counter-clockwise during the forward movement of the cultivator, and with such being known as a rod-weeder. In the use of such a rod-weeder, a source of power is necessary to effect such rotation of the square rod thereof. One method of effecting the rotation of such a square rod-weeder attachment is to take power in some form from a driven wheel of the carriage cart to which it is attached. In the use of my novel pair of pivotly rockable, tandem wheels, wherein each thereof rises and falls on its rocker pivot according to the contour of the land over which the carrier is being operated, I have provided a novel, efficient method of mounting a driven wheel upon the outer peripheries of both of my novel, freely rocking, pair of tandem wheels at all times during operative use thereof, despite the rising and falling of each of the pair thereof.

It is therefore a primary object of my invention to provide an individual section of such a farm tool carrier having a pair of wheels pivotly mounted in a novel tandem relationship to each other and also adapted for free rocking of the wheels on their pivot point, and which pivot point is adapted for hydraulic crank-pivotal raising or lowering thereof with relation to the horizontal plane of the frame of my tool carrier.

Another object of my invention is the provision of a novel power take-off from my tandem rocker wheels, comprising a driven wheel, adapted to ride upon the peripheries of both of my novel tandem rockable main pivot wheels, by a novel weighted pendulum sprocket pivotally carrying said power take-off wheel from a pivoted carrying arm of the frame, adapting the driven power take-off wheel at all times to ride upon the peripheries of both of my novel tandem rockable main wheels upon a rocking of my tandem main wheels.

Other objects will be apparent to those skilled in the art from the following detailed drawings, in which.

Figure 2:
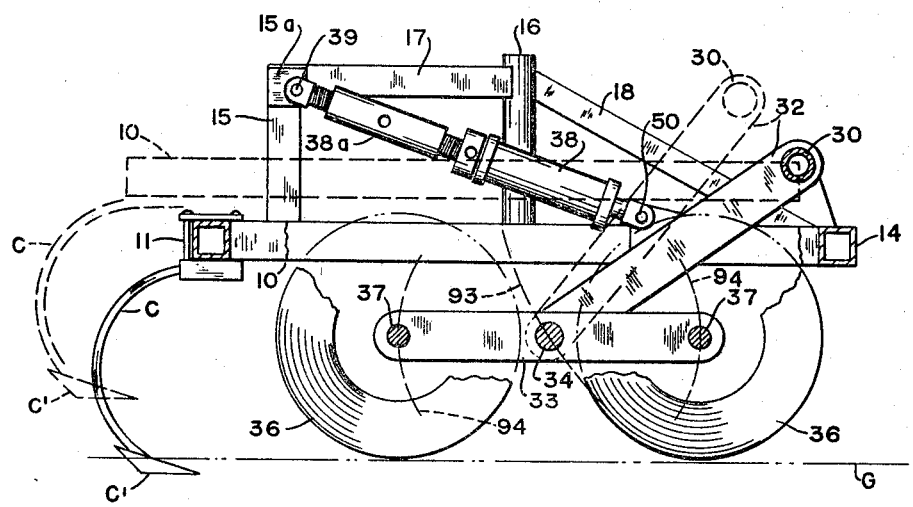
FIGURE 2 is a fragmentary side view thereof taken upon the line 2—2 and looking in the direction of the arrows, of FIG. 1.

FIGURE 4 is a side view of my carrier, similar to FIGURE 2, but with the addition of a rod-weeder attachment, R, secured to one of the chisels, C, and in alignment with my novel tandem main wheels, 36, and illustrating may novel pivoted-pendulum mounted power take-off driven wheel, 78, riding upon the peripheries of both of the main tandem rockable wheels; and FIGURE 5 is a partial, perspective view illustrating my novel pivoted dog-leg pendulum mounted power take-off driven wheel, 78, and shows the detailed construction thereof.

Figure 1:
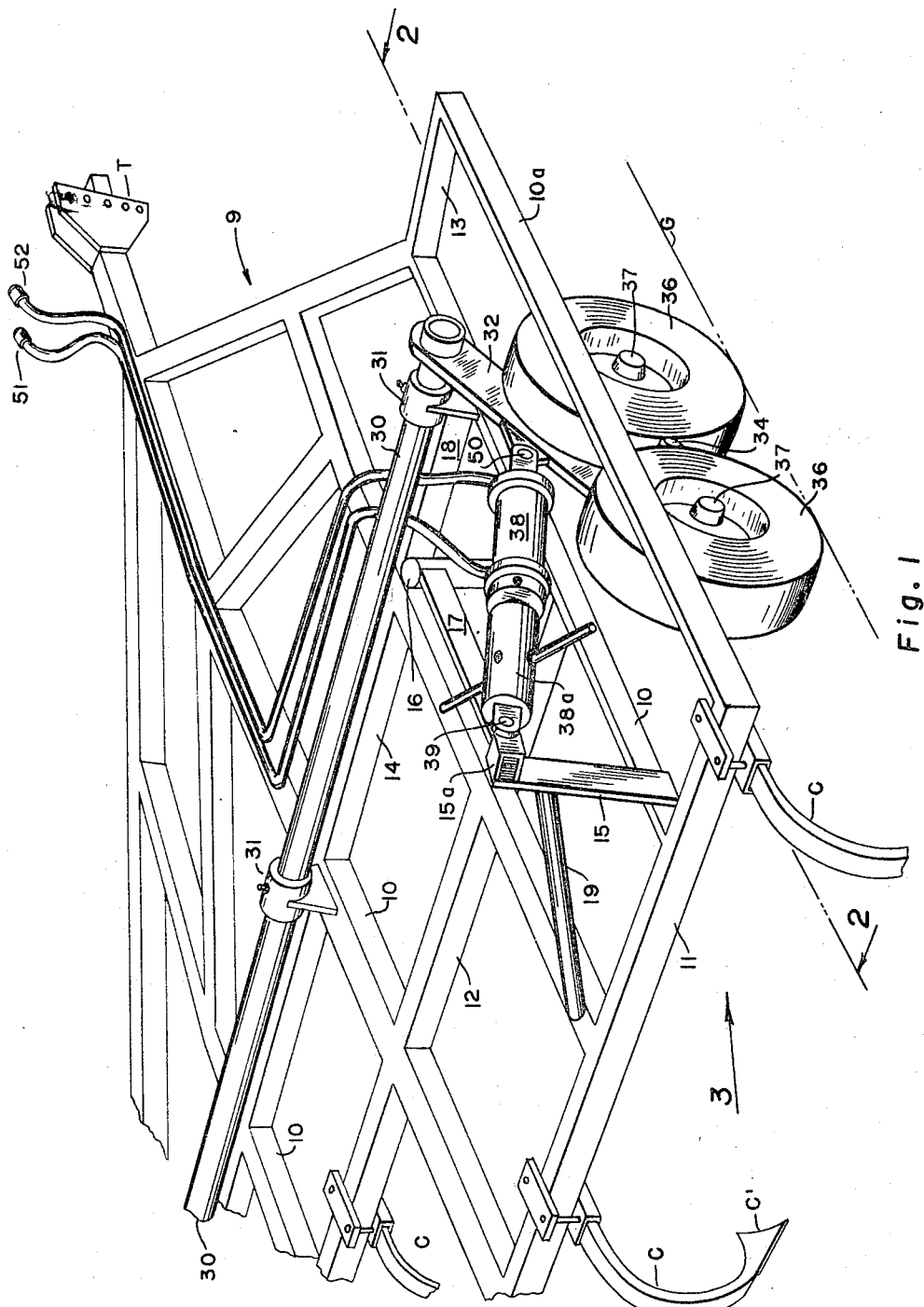
FIGURE 1 is a perspective, fragmentary view of a portion of one section of my tool carrier.

In FIGURE 1, I illustrate one section of my novel tool carrier having a tandem pair of pivotally freely rockable main wheels, 36, pivotally held by a crank, 30–32, operated by a hydraulic ram means. It will be understood that said section could have an identical set of such wheels, and an identical means of mounting and operating same, in all respects but on the left hand side of said unit, as illustrated, and connected with the rotatable pipe, 30, at its left end and in an identical well in the frame, 13, at said left side, and with its crank portion, 32, being in alignment with the crank portion 32 illustrated, so that, upon rotation of 30, the cranks would operate both pairs of tandem wheels at each side thereof in unison, although I only illustrate the one side of that section of my carrier, with its one set of wheels.

I provide a rigid horizontal frame, indicated generally as 9, of solid construction, preferably of channel bar sections, welded together to make a rigid horizontal unit, having cross bar portions, 11, 12 and 14, and front to back portions, 10 and 10a, as illustrated, and with a rigid extension projection therefrom formed into a rigid tow-bar, T, for connection to a tractor. I pivotally mount a pair of wheels 36 in tandem relationship, one behind the other, each at 37, onto a rocker arm 33 and pivotally mount the rocker arm to a conventional crank means. The crank means comprises a rotatable horizontal pipe portion 30 suitably journaled at bearings 31 onto the frame, and with a right angle crank, 32, extending from the rotatable portion 30. I pivotally mount the rocker bar 33 to the outer end of said crank 32, and centrally of said rocker bar by a suitable pivot 34. It will be noted that I provide a well or space, 13, in the frame at the side thereof and within which I so pivotally mounted the tandem rocker wheels. I operate the crank means, 30–32, by a conventional hydraulic ram, 38–38a, and which ram I pivotally mount, as illustrated, with one of its ends at a projection pivot point 50, on 32 and midway of that crank arm, and with the other of its ends pivoted at point 39, to another projection 15a at the top of a rigid post, 15. Post 15 extends vertically above the frame and has suitable rigid bracing to support it, being by another rigid post, 16, and a cross member, 17, and angular braces, 18 and 19, all of rigid sturdy construction and as illustrated. The hydraulic ram, 38, is of conventional type, with its hydraulic connecting tubes, 51 and 52, adapted for connection with the hydraulic system of the tractor pulling the carrier and to which the unit is attached. Said hydraulic ram is of two directional operational ability, depending upon which side of the piston thereof the hydraulic force is exerted, as is conventional. I provide a method of adjusting the length of the piston arm by an adjustment-screw-collar, 38a.

Conventional agricultural tools, of the type explained, are suitably rigidly secured to one or more of the cross bars, 11 and 12, of the horizontal frame, 9, as desired, such as conventional dry land chisel members, C, illustrated each having a chisel duck foot blade, C'.

Figure 3:
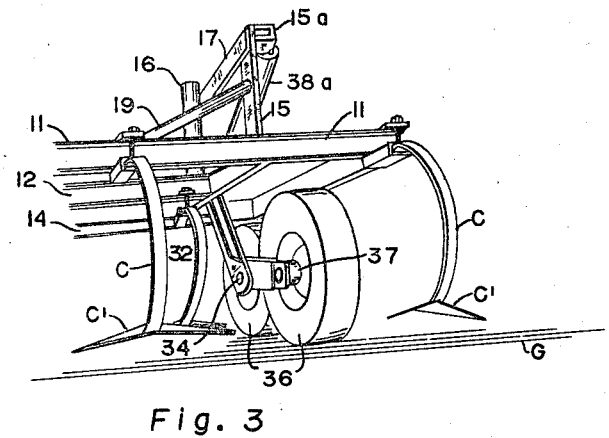
FIGURE 3 is a reduced, fragmentary, under-side, perspective view looking in the direction of the arrow 3 of FIGURE 1.

I have illustrated the tandem rockability of the pair of main wheels, 36, by their rocker arm, 33, as on the dotted line arc 94, defined by the pivot point 34 of the crank 32 in FIGURES 2 and 4. It will be observed that said pivot point 34 is raised or lowered in an arc, illustrated by dotted line 93, defined by the pivot point 30. FIGURES 1 and 3 illustrated the position of the wheels 36 in inoperative position of the carrier, and FIGURES 2 and 4 illustrate the position of the crank 32 and rocker arm pivot 34 and position of the wheels 36, with relation to the horizontal frame, for a dragging of the chisels C' through the ground as the carrier is pulled forwardly, or in operative position of the carrier or to the right as illustrated. It will be seen that when hydraulic power causes the hydraulic ram, 38, to contract along its piston shaft, 38a, and thus pull its pivot point 50 toward its pivot point 39, that such causes the crank, 30–32, to rotate clockwise on its pivot axis 30, and thereby the crank 32 raises the main wheels 36, by point 34 raising the rocker arm 33, with relation to the horizontal frame illustrated as 10 in FIGURE 2, or into operative position of the chisel members C' and whereby said chisels will be pulled through the ground below the level of the underside of the wheels, as the machine is pulled forwardly or to the right as illustrated, FIGS. 2 and 4. Conversely, when hydraulic fluid is injected into the hydraulic ram, 38, to cause it to expand or to push its pivot 50 away from its pivot 39, such will effect a counterclockwise rotation of the crank 32 on its axis 30, and will thereby, in effect, raise the frame, 9, into inoperative position of said duck foot C', or above the level of the ground; see FIGURE 3.

I provide a novel power take-off means for use with my novel tandem rocking wheels, 36, to operate a conventional rod-weeder attachment, R. Such an attachment, R, consists of a housing enclosure, as illustrated in FIGURE 4, which is rigidly secured to and carried by one of the chisel arms, C, and which chisel is in alignment behind a pair of my novel tandem wheels. It will be understood, though not illustrated, that there are a pair of such rod-weeder housings which are secured in alignment with each other, and on aligned chisel members, C, and that a square rod is journalled for rotation in the lower portion of each of said housings and that rod extends horizontally between said housings, R. Number 53 represents such a square rotatable rod-weeder rod member in the lower portion of such a rod-weeder housing, rotated by a chain sprocket means mounted thereon and within its housing, and with such housing also having another rotatable chain sprocket at the top thereof mounted on a pivot rod 35 extending through its upper housing, and with a loop chain 55 extending over the sprockets 53 and 35b within said housing. Such conventional rod-weeder housing, R, parts and construction will be understood, though not fully illustrated. Another chain sprocket 35a is mounted on the shaft 35 exteriorally of said rod-weeder housing, R.

In my novel power take-off driven means, indicated generally as P, for taking power from my main rockable tandem wheels, 36, I utilize a single power driven wheel, 78, and relative thereto it should be borne in mind that said main wheels rock upon the pivot point 34, in passing over uneven ground, by their pivot rocker arm 33. I provide a novel dog-leg pivot-pendulum means for mounting said power take-off wheel, 78, so that it will ride upon the peripheries of both of said tandem main wheels 36 as these main wheels rocker-rise and fall during operation of the machine over uneven ground. Such novel dog-leg pivot pendulum means consists of a pivot supporting arm, 58, substantially horizontally positioned by being suitably pivoted at one of its ends to point 56 at the top of the rod-weeder housing arm, and at the other end of 58 I pivotally hang a novel sprocket, 76–76, from a pivot point 59, in pendulum fashion. Sprocket 76 is hung by a pivot rod 59a to the pivot point 59 at its upper end, and has the power take-off driven wheel 78 suitably journalled and hung at its lower end, at point 77. I provide a weighted or heavy solid member, 90, between the sprocket side members, 76, as illustrated, for reason to be explained. Pivot supporting arm 58 is extended through a yoke member, 57, rigidly clamped as part of the means of securing the chisel member, C, to the frame, 11, and said yoke is elongated vertically as a guide means to permit pivot sprocket arm 58 to move freely up and down therein on its pivot point 56. I secure a suitable chain sprocket gear, 79, to the wheel, 78. A chain guide bar 70, as illustrated, is rigidly secured to the arm 58, and has idle chain sprocket gears, 71 and 72, at each end thereof. Gear 72 is adjustable in a conventional manner in a slot in 70, in terms of its distance from the idle gear 71. Another chain guide bar, 73, is provided on the pivot shaft 59a, and has idle chain gears, 74 and 75, at each end thereof. A loop drive chain, 91, is placed in meshed relationship over said chain sprocket wheels 35a, 72, 74, 79, 75 and 71, for transmitting pulley movement of wheel 79 from the power driven wheel, 78, to the chain driven wheel, 35a, of the rod-weeder unit, which in turn transmits revolving power through the unit's loop chain belt, 55, within the unit R, for effecting counter-clockwise rotation of the rod-weeder's square shaft, 53. As the frame 10 is raised, to position the tool, chisel C', into inoperative position, or above the ground, by operation of the hydraulic ram for bringing pivot points 39 and 50 towards each other into the position of the frame 10 and the crank 32, as illustrated in dotted lines in FIGURE 2, I provide a stop bar, 92, on the side of the sprocket, 76, and which stop bar is adapted to abut onto the upper side of the frame member 10a during raising of that frame member 10a, for purpose of effecting a raising of the power driven wheel 78 out of operative contact with the peripheries of the wheels 36.

The normal width of a section of my novel tool carrier, as first explained, is approximately 13 feet, and as previously explained, with its center section similar to the one illustrated in FIGURE 1 having two identical pairs of tandem wheels, and has outer sections to the right and left thereof and hinged thereto and each outer section having only one set of wheels, the right hand one of said outer sections being illustrated in FIGURE 1. It will be seen that my novel means of mounting each tandem pair of wheels for free rocking movement thereof, by the rocker arm 33, provides a novel plural wheeled carrier for use over semi-rolling ground. Each pair of tandem wheels freely rocks by their rocker arm 33 on the pivot point 34 at the lower end of the crank 32, or in the arc indiated as 94 in the dotted lines of FIGURE 4. Such rocking of the wheels, 36, during use, means that the one of said wheels will rise in its individual arc and the other thereof will fall in that arc on the axis, 34. For more efficient power take-off operation, to take power to operate the rod-weeder attachment, I have developed my novel dog-leg pendulum-pivot means of mounting said driven wheel, 78, so that said wheel rides substantially centrally above the pivot point 34 of the rocker wheels, 36, and rides equally on the peripheries of both those rocker wheels as they rock on that pivot point 34. Such a means of having a power driven wheel ride upon the peripheries of both of those two rocker wheels, as illustrated in FIGURE 4, provides a novel and efficient means for transmission of such frictional drive power take-off. My novel weighting of the sprocket, 76, during operative use of my carrier helps to assure frictional contact of the driven wheel, 78, against the wheels, 36.

It is to be noted that my novel power take-off means P includes the substantially horizontal rigid pivoted freely vertically swingable arm 58, with its one end pivoted to the upper end of the implement R housing, and my freely swingable pendulum 76, carrying the power take-off wheel 78, pivoted to the other end of the pivot arm 58. The vertical up and down swing of arm 58 is limited only by the yoke member, 57.

As many changes and modifications in the embodiment of my invention, herein illustrated and described, may be made by those skilled in the art, and without deviating from the spirit and teaching of my invention, I wish to be bound only by the hereto appended claims.

What I claim and desire to secure by Letters Patent is:

1. In a farm tool carrier, in combination, a rigid horizontal frame having a yoke extension thereabove and having a wheel well and a rigid tow-bar extending horizontally therefrom and an operable farm implement secured to said frame adjacent said yoke, a pivot-crank means having a rotatable pivot portion journaled on and carried by said frame, and a crank portion extending from the rotatable portion for arc movement within said wheel well, a pair of main frame-weight-carrying wheels pivotally mounted substantially centrally of the frame in front to rear aligned tandem relationship with each other onto and carried by said crank portion of the pivot-crank means and mounted for free pivotal rocking movement on a common pivot point connection with said crank portion, rocker arm means for pivotally carrying said tandem wheels for such free pivotal rocking and carried on and by said crank portion of said pivot-crank means, and a driven power take-off wheel adapted to ride upon said main tandem wheels and being positioned in vertical alignment above said common pivot point of said main tandem wheels and being pivotally carried on and by a pivot-arm-pendulum means pivotally connected with said agricultural implement, means for said connecting said pendulum means to said agricultural implement, said pendulum connection with the agricultural implement extending within said yoke means, said pendulum means being adapted for free pivoting at its said connection means, and said connection means including a power conveying means between said power driven wheel and said agricultural implement.

2. In a farm tool carrier having a pair of pivotal freely rockable, front to back tandem, main carrying wheels pivotally mounted to a frame, and the frame having an operable downwardly pulling agricultural implement secured thereto in projected alignment with said tandem wheels, the combination therewith of a power transmission and take-off wheel means having a power take-off wheel for funishing power to operate said implement and with said power take-off wheel adapted to ride upon the upper peripheries of both of such tandem freely rockable main wheels, comprising, a yoke guide means extending vertically from said frame in alignment between the agricultural implement and said wheels, a pivot supporting arm pivoted at one end to said agricultural implement and extending substantially horizontally through said yoke guide means and with its other end extending to a point substantially above and adjacent mid-way between said main wheels, and a sprocket means pivotally hinged to and carried as a pendulum from said other end of said supporting pivot arm and having said power take-off driven wheel carried by the lower portion thereof, said latter wheel having a drive pulley means secured thereto, said agricultural implement having a driven pulley wheel operably secured thereto for conveying the power to operate said implement, guide pulley means on said pivot supporting arm, and a power transmission pulley belt means extending from said power driven pulley wheel and over said pulley guide means to and over said implement driven pulley wheel, and said sprocket power driven wheel pendulum means having a weighted portion secured thereto to substantially assist the normal weight of the entire pivot arm and sprocket means take-off wheel in effecting pivotal-pendulum and riding frictional contact of the wheel on the peripheries of both os said main wheels during power operation take-off thereof and during rocking movement of such tandem wheels.

3. In a farm tool carrier having a frame having a vertical yoke guide means, a pair of vertically adjustable pivotal freely rockable front to back tandem main weight-carrying wheels pivotally mounted to the frame, and an operable agricultural implement secured to the frame in extended alignment with and behind said wheels, with said implement effecting a downward pulling upon the frame upon operation of the implement, the combination therewith of a power drive means to operate said implement with power frictionally taken from the peripheries of both of said main tandem wheels comprising, a dog-leg pivotally jointed arm means pivoted at one of its ends to the agricultural implement and extending upwardly and forwardly through the yoke guide means of the frame, a power drive wheel means gravity-frictionally resting on and between the peripheries of both of said main tandem wheels and being pivotally secured to the other end of the dog-leg arm means and with that other end of the dog-leg arm means positioned below its dog-leg joint, the drive wheel means being operably power drivingly connected to said operable agricultural implement for transmitting power therefrom to operate said implement, with the weight of substantially most of the power drive means and the rotational frictional directional contact movement of the peripheries of the main tandem wheels with the drive wheel means, on the peripheries of which main tandem wheels the other end of the power drive means dog-leg arm and its drive wheel gravity rest, together comprising urging means for normally urging the drive wheel periphery into frictional driving engagement with the peripheries of both of said main tandem wheels for effecting said power take-off thereby and therefrom for the operation of said implement.

References Cited

UNITED STATES PATENTS

| | | | |
|---|---|---|---|
| 2,588,918 | 3/1952 | Graham | 172—413 X |
| 2,734,437 | 2/1956 | Erling | 172—413 |
| 2,892,504 | 6/1959 | Mowbray | 172—44 |
| 2,985,247 | 5/1961 | Oehler et al. | 172—413 |
| 3,115,940 | 12/1963 | Heinrich | 172—44 |
| 3,220,740 | 11/1965 | Kavan et al. | 275—6 |
| 2,886,906 | 5/1959 | Moses | 37—180 X |
| 3,184,243 | 5/1965 | Brisbin et al. | 172—105 X |

ABRAHAM G. STONE, *Primary Examiner.*

JIMMIE R. OAKS, *Assistant Examiner.*

U.S. Cl. X.R.

172—44